(12) United States Patent
Ramotowski

(10) Patent No.: US 8,299,187 B1
(45) Date of Patent: Oct. 30, 2012

(54) METHOD FOR IMPROVING ACOUSTIC IMPEDANCE OF EPOXY RESINS

(75) Inventor: Thomas S. Ramotowski, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 273 days.

(21) Appl. No.: 12/813,868

(22) Filed: Jun. 11, 2010

(51) Int. Cl.
*C08L 63/02* (2006.01)

(52) U.S. Cl. ...................................................... 525/523

(58) Field of Classification Search .................. None
See application file for complete search history.

(56) References Cited

U.S. PATENT DOCUMENTS

| | | | |
|---|---|---|---|
| 4,550,129 A | 10/1985 | Nir | |
| 4,585,826 A | 4/1986 | Graves | |
| 5,025,068 A * | 6/1991 | Garcia et al. | 525/119 |
| 6,346,292 B1 * | 2/2002 | Grubb et al. | 427/195 |
| 7,528,195 B2 * | 5/2009 | Ramotowski | 525/113 |
| 2003/0196753 A1 * | 10/2003 | Schoenfeld et al. | 156/330 |
| 2007/0003758 A1 * | 1/2007 | Jin | 428/343 |
| 2008/0145667 A1 * | 6/2008 | Barker | 428/413 |

OTHER PUBLICATIONS

Noveon product data sheet for Hycar CTBN 1300X8, 2012, three pages.*

* cited by examiner

*Primary Examiner* — Robert Sellers
(74) *Attorney, Agent, or Firm* — James M. Kasischke; Michael P. Stanley; Jean-Paul A. Nasser

(57) ABSTRACT

An epoxy and rubber microcomposite is formed by adding a carboxy-terminated or amine-terminated rubber component having a glass transition temperature less than zero degrees centigrade to a bisphenol A based epoxy resin component; heating the mixture to 150 degrees centigrade; cooling and curing with a suitable curing agent. A phase segregation occurs between the epoxy resin component and the rubber component to form discrete, spherical rubbery domains with the epoxy compound. Because the glass transition temperature of the rubbery domains is below zero degrees centigrade; the rubbery domains act as acoustic windows within the high-modulus epoxy compound.

8 Claims, 1 Drawing Sheet

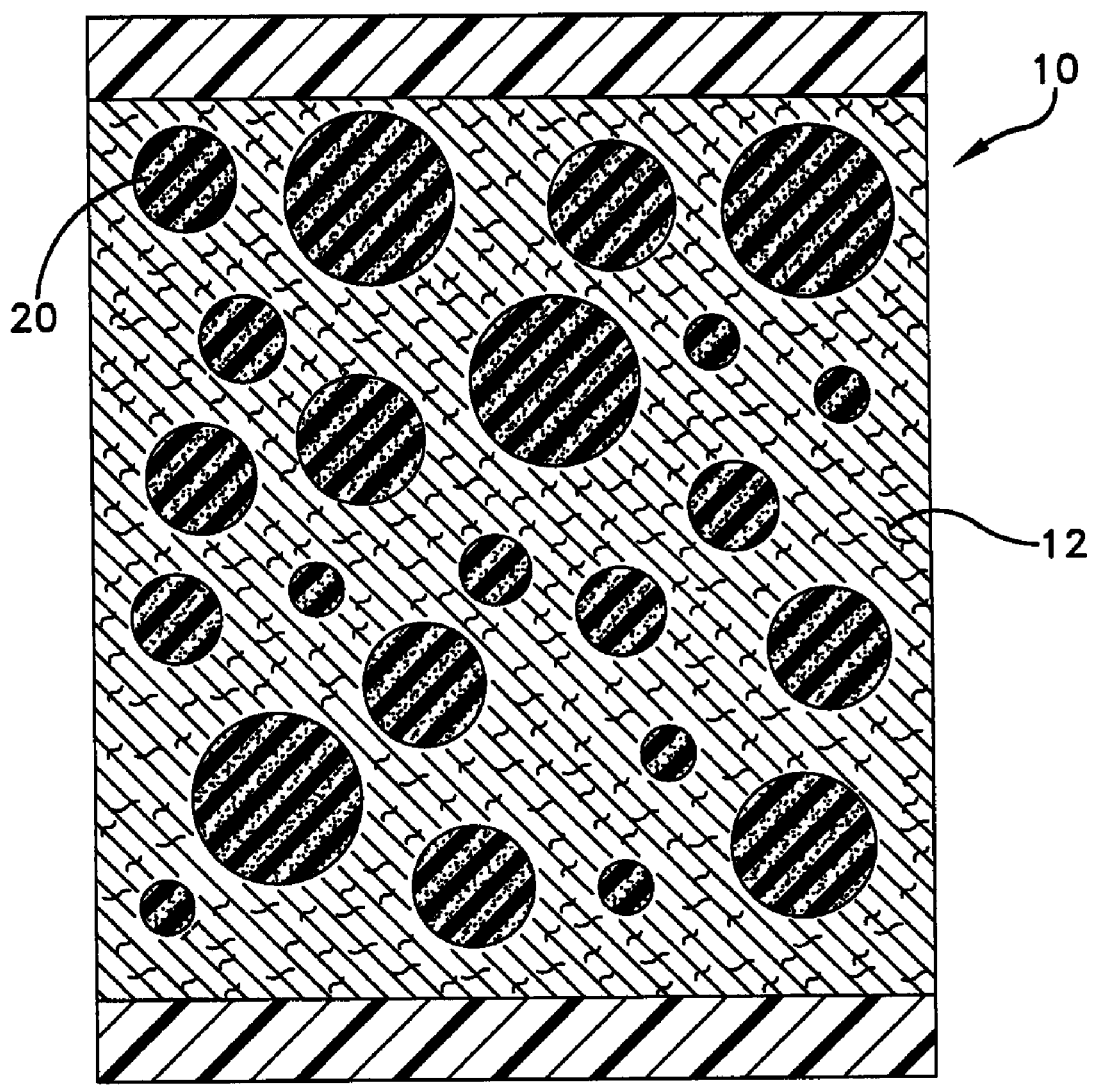

METHOD FOR IMPROVING ACOUSTIC IMPEDANCE OF EPOXY RESINS

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to method for producing low modulus acoustically clear polymeric materials.

2) Description of Prior Art

In general, "acoustically clear" polymeric materials have a low modulus (i.e., stiffness). Examples of these polymeric materials include neoprene, ethylene propylene diene monomer (EPDM) and polyurethane rubbers. Typical applications of these materials encapsulate and protect acoustic projectors and hydrophones from marine environments. In order to function properly in these applications as "acoustic windows"; the polymeric materials need to exhibit a variety of physical properties. The most important of these physical properties provide a close match in density "$\rho$" and speed of sound "c" with the surrounding medium (for example: seawater). The speed of sound and density tend to be directly proportional to the square root of modulus and inversely proportional to the square root of density. Therefore, "hard" and "stiff" polymers exhibit poor $\rho$ and c matches with seawater and are not used in applications that require acoustic transparency.

However, the lower modulus materials provide less structural strength and certain applications require a higher degree of protection (than is typically provided by the lower modulus materials) while maintaining acoustically clear properties. To maintain a desired structural strength and integrity; holed or cut-out acoustic windows composed of a different material (e.g., rubber) cannot be used. Thus, a hard, strong and acoustically transparent material is needed. Suitable high modulus, castable polymers that also exhibit an acceptable acoustic impedance match with seawater are also needed.

SUMMARY OF THE INVENTION

Systems and methods in accordance with exemplary embodiments of the present invention chemically modify epoxy resins to improve their acoustic impedance. Presently, most high modulus castable polymeric materials (of which epoxies are a common example) exhibit high acoustic impedances relative to seawater. This high impedance prevents use in applications where acoustic energy must enter and pass through a polymer without significant reflection of absorption.

In accordance with one embodiment, the present invention is directed to a method for improving the acoustic impedance of an epoxy resin. In this method, an epoxy resin component is mixed with a rubber component. The epoxy resin component is preferably a bisphenol A epoxy resin.

The rubber component has a glass transition temperature of less than zero degrees centigrade—for example, less than −30° C. and preferably from −39° C. to −80° C. In one embodiment, the rubber component is a carboxy-terminated rubber, an amine-terminated rubber or combinations thereof. For example, the rubber component can be carboxy-terminated butadiene, carboxy-terminated butadiene nitrile, carboxy-terminated butadiene-nitrile with pendant nitrile groups, amine-terminated butadiene, amine-terminated butadiene nitrile or combinations thereof.

In one embodiment, the rubber component is added to the epoxy resin component in a concentration of approximately 10 to 30 parts by weight per 100 parts by weight of the epoxy resin component. Suitable rubber components have a molecular weight of approximately 3000 Daltons to 4200 Daltons and contain up to thirty percent by weight of acrylonitrile (for example: from approximately eighteen to a twenty-six percent by weight of acrylonitrile).

The mixture is heated to react the epoxy resin component with the rubber component. This reaction temperature is from 72° C. to approximately 200° C., preferably 150° C. The reacted mixture is then naturally-cooled to an ambient temperature.

A curing agent is added to the cooled reacted mixture to form an epoxy and rubber microcomposite having a plurality of small spherical rubbery domains within an epoxy matrix. Each spherical rubbery domain has a diameter of approximately fpm to approximately 10 μm. Suitable curing agents include 2-Ethyl-4-methyl-imidazole and n-aminoethylpiperazine.

The present invention is also directed to an epoxy and rubber microcomposite that contains a plurality of small spherical rubbery domains within an epoxy matrix wherein the spherical rubbery domains are a rubber component having a glass transition temperature of less than zero degrees centigrade. Alternatively, the glass transition temperature of the rubber component is from approximately −39° C. to −80° C. Each spherical rubbery domain has a diameter of from approximately 1 μm to 10 μm.

In one embodiment, the epoxy matrix is a bisphenol A epoxy resin. The rubber component can be carboxy-terminated butadiene, carboxy-terminated butadiene nitrile, carboxy-terminated butadiene-nitrile with pendant nitrile groups, amine-terminated butadiene, amine-terminated butadiene nitrile or combinations thereof. The rubber component can have a molecular weight from approximately 3000 Daltons to 4200 Daltons and can include from approximately eighteen percent to twenty-six percent by weight of acrylonitrile.

BRIEF DESCRIPTION OF THE DRAWINGS

These and other features and advantages of the present invention will be better understood in view of the following description of the invention taken together with the drawing wherein:

FIG. 1 is a schematic view of the present invention.

DETAILED DESCRIPTION OF THE INVENTION

To improve the acoustic impedance of epoxies, various amounts of liquid rubbers are added to heated epoxy resin. Suitable liquid rubbers include, but are not limited to, carboxy-terminated rubbers such as carboxy-terminated butadiene (CTB), carboxy-terminated butadiene nitrile (CTBN) and carboxy-terminated butadiene-nitrile with pendant nitrile groups (CTBNX) as well as amine-terminated liquid rubbers such as amine-terminated butadiene (ATB) and amine-terminated butadiene nitrile (ATBN). The liquid rubbers react with epoxide groups present on the epoxy resin molecule; thereby, bonding to the epoxy polymer chains.

After the heated resin cools, the rubbery portions of the liquid rubber phase segregate from the epoxy resin. This process is analogous to the separation of an oil and water mixture. The materials naturally separate from each other during the curing of the epoxy resin due to solubility limits. Before an epoxy curing agent is added, the CBTN is soluble in the epoxy resin.

At this point, the epoxy curing agent is added with the epoxy and then cast and poured. Once the curing agent is added, the epoxy starts to cross-link (cure)—forming a solid network. Suitable methods for casting and pouring epoxies are known and available in the art. The amount of (still) liquid epoxy resin continuously decreases (the resin is being depleted by the crosslinking/cure reaction).

At some point, the solubility limit for the CBTN is reached (as the amount of the liquid epoxy resin drops, the concentration of the CBTN in the remaining liquid epoxy resin increases); thereby, forcing some of the CBTN to extract from the solution. As the cure progresses, more CBTN progressively extracts from the solution—because progressively less of the liquid epoxy resin remains.

If the solubility is properly set, CBTN spheres are in the solution. However, if the CBTN is very soluble in the epoxy resin, most of the CBTN remains dissolved even during the cure reaction and all that is in result is comparatively very small beads of CBTN scattered throughout the resin. If the CBTN has a very low solubility, the CBTN will extract completely and quickly; thereby forming a continuous band or layer above the epoxy. Note that the CBTN solubility is controlled by the amount of nitrile attached to the butadiene backbone.

The resulting epoxy contains a plurality of small spherical rubbery domains within the epoxy matrix. In one embodiment, each spherical rubbery domain has a diameter of approximately 1 to 10 μm. In FIG. 1, a schematic of an example arrangement is shown. In the FIGURE, item 10 is a composite material including epoxy matrix material 12 with rubbery domains 20. The homogeneous spherical rubbery domains 20 are homogeneous and have a lower density and sound speed than the epoxy itself. Therefore, the acoustic impedance of the resulting microcomposite 10 is substantially lower than that of the epoxy by itself. The rubbery micro-domains 20 also increase the toughness or resilience of the microcomposite 10. For example, cracks that form in the brittle epoxy matrix will quickly intercept one or more of the rubbery domains 20. Since the rubbery domains 20 are elastomeric, the propagation of a crack is halted.

In accordance with one exemplary embodiment, the present invention provides epoxy resin having low modulus spherical rubbery domains 20. These spherical rubbery domains 20 are created from a rubber component that is introduced into the epoxy resin as a liquid rubber such as a carboxy-terminated rubber, an amine-terminated rubber or combinations thereof.

In order to impart the desired properties to the epoxy resin, the rubber component has a glass transition temperature, "$T_g$" that is significantly below ambient conditions. Suitable glass transition temperatures are less than 0° C., preferably less than −30° C. In one embodiment, the glass transition temperature of the rubber component is approximately −39° C. to −80° C.

Suitable molecular weights for the rubber component range from approximately 2000 Daltons to 4500 Daltons. Preferably, the molecular weight is from approximately 3000 Daltons to 4200 Daltons. The amount of acrylonitrile in the rubber component can be varied from zero percent by weight to thirty percent by weight.

Different percentiles of acrylonitrile can be incorporated into the rubber component to improve solubility in the epoxy resin. In general, acrylonitrile increases the solubility of the rubber component in the epoxy resin. Acrylonitrile is a polar chemical group (i.e., having a strong dipole) so that the acrylonitrile imparts some polarity to the polymer. Most epoxy resins are also polar, so an increase in polarity helps the rubber component dissolve in the epoxy resin. If too much acrylonitrile is present, the rubber component will not phase segregate (or will do so poorly) when the epoxy cures. In one embodiment, the acrylonitrile is present from approximately eighteen percent by weight up to approximately twenty-six percent by weight. Suitable epoxy resin components include bisphenol A epoxy resins.

After the liquid rubber component is added to the epoxy resin, a curing agent is added to the epoxy resin. Suitable epoxy resin curing agents include, but are not limited to, imidazole curing agents such as 2-Ethyl-4-methyl-imidazole (2,4-EMI), N-aminoethylpiperazine and similarly known commercially—available materials.

In one embodiment, the liquid rubber component is added to the desired epoxy resin that is at an elevated temperature. Suitable elevated temperatures are approximately 72° C. to 200° C. Preferably, the epoxy resin is at a temperature of 150° C. In one embodiment, the liquid rubber component is added to the epoxy component in a concentration of approximately 10 to 30 parts per 100 parts of the epoxy resin. The rubber component and epoxy resin component are reacted at the high temperature; either by adding the rubber component to heated epoxy resin or by adding the rubber component to the epoxy resin component and then heating the mixture.

In one embodiment, the reaction temperature is selected based upon the time desired for the reaction as lower temperatures require longer reaction times. In one embodiment, the reaction time is up to one hour. During the reaction, the rubber component and the epoxy resin component are mixed by a stirring process similar to stirring a high viscosity liquid.

Following the heated reaction, the modified epoxy resin is cooled (for example: to ambient or room temperature). The cooled and modified epoxy resin is then reacted with a suitable curing agent. Phase segregation occurs between the epoxy resin and the rubber component based on the gelation rate of the epoxy. There is a sharing of parts in the chemical reaction by cross-linking and gelling. As the epoxy resin cross-links and gels, the rubber component phase segregates from the epoxy resin and forms discrete, spherical rubbery domains throughout the epoxy resin. The curing agents at ambient or higher temperatures support/encourage this morphology via 3-D cross-linking between the rubber and the epoxy.

The rubber component imparts a significant improvement in toughness and cracking resistance to the epoxy resin. Also, because the glass transition temperature of the rubber component is selected to be significantly below the ambient operational temperature range, the rubber component acts as an acoustically clear material. In one embodiment, the amount of the rubber component added to the epoxy resin is low enough that the modulus of the resulting composite is similar to the unmodified epoxy resin (i.e., it is a high modulus). Therefore, the resulting composite provides the desired strength and toughness.

The materials are non-brittle when cast in place and exhibit adhesion to many surfaces. Also, the resulting composite produced by the method of the present invention exhibits improved crack resistance, toughness, and is much less brittle than presently—known materials.

The chemical modifications lower the density, speed of sound and acoustic impedance of the resulting epoxy and rubber microcomposite. In addition, the chemical modifications improve the fracture toughness of the resulting epoxy and rubber microcomposite.

When cured (hardened), the resulting material is still hard and stiff (i.e., adding the liquid rubber decreases the modulus of the resulting microcomposite) but not to the point where the material is "rubbery". Thus, the material can be used by itself in certain structural applications and with appropriate fillers in many more applications. The microcomposite material initially is a liquid which can be cast into any desired shape.

The material is significantly less brittle than most higher modulus polymers. For example, the material can be hit with a hammer and not chip, crack of shatter. The acoustic transparency of the microcomposite material is much improved over the parent epoxy. The material of the invention is a high modulus material that can function as an acoustic window either by itself or as part of a more complex composite structure.

Examples of the microcomposite compound of the present invention can use various formulations of epoxy resins and rubber compounds. These formulations are illustrated in Table 1.

TABLE 1

| Designation | 2000X162 | 1300X9 | 1300X8 | 1300X13 |
| --- | --- | --- | --- | --- |
| Type | CTB | CTBNX | CTBN | CTBN |
| % AN | 0 | 18 | 18 | 26 |
| Molecular Wt. Mn | 4200 | 3600 | 3550 | 3150 |
| $T_g$ (C.) | −77 | −52 | −52 | −39 |

In the table, "Designation" refers to the product designation and number of the NOVEAN HYCAR epoxy resin that is commercially available. However, the material can be generic as epoxy resin and carboxy-terminated butadiene nitrile rubber. The "Type" of product line identifies the liquid rubber component chemically. "CTB" is carboxy-terminated-butadiene;" CTBN is carboxy-terminated-butadiene-nitrile, and "CTBNX" is carboxy-terminated-butadiene-nitrile with pendant nitrile groups.

The "% AN" row indicates the amount of acrylonitrile present in each additive. "Molecular Wt. Mn" is the number of the average molecular weight of the additive in Daltons. Finally, "$T_g$" is the glass transition temperature of each additive in degrees centigrade. Above the $T_g$, the additive is soft and rubbery; below $T_g$, the additive is hard and brittle.

The four liquid rubber additives used to modify the base epoxy were chosen so that the effect of differences in these major properties could be evaluated including how these formulations affect the density, sound speed and acoustic impedance of the resulting, modified epoxy resins. As the percentage of the rubber component increases from zero percent to weight twenty percent weight; the density of the composite material decreased from 1.17 g/cc to 1.11 g/cc (grams/cubic centimeter) to approximately 1.14 g/cc depending on formulation. In addition, the speed of sound went from about 2500 meters per second to 2150 to approximately 2400 meters per second. The acoustic impedance dropped from approximately $2.9 \times 10^6$ kg/m²s to $2.4 \times 10^6$ to $2.7 \times 10^6$ kg/m²s (kilograms per meter squared x second).

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method for improving the acoustic impedance of an epoxy resin, said method comprising the steps of:
   providing an epoxy resin component wherein the resin component comprises a bisphenol A epoxy resin;
   providing a rubber component wherein the rubber component has a glass transition from −39° C. to −80° C. degrees centigrade, has a molecular weight of 3000 Daltons to 4200 Daltons and comprises up to thirty percent by weight of acrylonitrile;
   mixing the epoxy resin component with the rubber component wherein the rubber component is added to the epoxy resin component in a concentration of approximately 15 to 30 parts by weight per 100 parts by weight of the epoxy resin component;
   heating the mixture to a temperature from 72° centigrade to 200° centigrade to react the epoxy resin component with the rubber component;
   cooling the reacted mixture to an ambient temperature;
   adding a curing agent to the cooled reacted mixture; and
   cross-linking the bisphenol A epoxy resin with the curing agent to form a rubber microcomposite having a plurality of spherical rubbery domains within an epoxy resin matrix.

2. The method of claim 1, wherein the rubber component is a carboxy-terminated rubber.

3. The method of claim 2, wherein the rubber component further comprises an amine-terminated rubber.

4. The method of claim 1, wherein the rubber component comprises an amine-terminated rubber.

5. The method of claim 1, wherein the rubber component consists of carboxy-terminated butadiene, carboxy-terminated butadiene nitrile, carboxy-terminated butadiene-nitrile with pendant nitrile groups, amine-terminated butadiene and amine-terminated butadiene nitrile and mixtures thereof.

6. The method of claim 1, wherein the curing agent comprises 2-Ethyl-4-methyl-imidazole.

7. The method of claim 1, wherein the curing agent comprises N-aminoethylpiperazine.

8. The method of claim 1, wherein each spherical rubbery domain has a diameter of 1 μm to 10 μm.

* * * * *